(12) United States Patent
Doran

(10) Patent No.: US 10,413,800 B1
(45) Date of Patent: Sep. 17, 2019

(54) SPORTS EQUIPMENT ORGANIZING DEVICE

(71) Applicant: John Doran, Cypress, CA (US)

(72) Inventor: John Doran, Cypress, CA (US)

( * ) Notice: Subject to any disclaimer, the term of this patent is extended or adjusted under 35 U.S.C. 154(b) by 0 days.

(21) Appl. No.: 15/906,650

(22) Filed: Feb. 27, 2018

Related U.S. Application Data

(60) Provisional application No. 62/467,710, filed on Mar. 6, 2017.

(51) Int. Cl.
*A63B 71/00* (2006.01)
*F16M 13/02* (2006.01)
*A47G 23/02* (2006.01)

(52) U.S. Cl.
CPC ....... *A63B 71/0045* (2013.01); *F16M 13/022* (2013.01); *A47G 23/0241* (2013.01)

(58) Field of Classification Search
CPC ............ A63B 71/0045; A63B 71/0036; A63B 2102/18; A63B 71/022; A47G 23/0241; F16M 13/022
See application file for complete search history.

(56) References Cited

U.S. PATENT DOCUMENTS

| | | | | |
|---|---|---|---|---|
| 4,193,495 A | * | 3/1980 | Keeley | A63B 71/0045 294/143 |
| D264,521 S | * | 5/1982 | Parr | D3/281 |
| D363,613 S | * | 10/1995 | Ehrmann | D6/316 |
| 5,462,328 A | * | 10/1995 | Chandler | A63B 47/00 294/143 |
| D373,498 S | * | 9/1996 | Young | D6/552 |
| 5,853,092 A | * | 12/1998 | Goodman | A47F 5/0823 211/70.6 |
| 6,053,340 A | * | 4/2000 | Cameron | A47B 81/00 211/85.7 |
| D431,137 S | * | 9/2000 | McBarnette | D6/513 |
| D479,423 S | * | 9/2003 | Mahoney | D6/552 |
| 6,684,815 B1 | * | 2/2004 | Rakoczy | A01K 7/00 119/72 |
| 6,749,074 B1 | * | 6/2004 | Hileman | A47B 81/005 211/60.1 |
| 6,880,711 B2 | * | 4/2005 | Collier | A47G 25/0671 211/85.3 |
| D508,771 S | * | 8/2005 | Gibson | D3/259 |
| 6,948,627 B1 | * | 9/2005 | Evans | A47G 25/0685 211/105 |
| 7,673,759 B2 | * | 3/2010 | Stukenberg | A47G 1/1646 211/41.7 |
| 7,789,248 B1 | * | 9/2010 | Salerno | A47G 25/08 211/85.7 |
| 8,245,858 B2 | * | 8/2012 | Doran | A47B 81/00 211/85.7 |
| 8,371,457 B2 | * | 2/2013 | Entz | A47B 43/00 211/85.7 |

(Continued)

*Primary Examiner* — Ko H Chan
(74) *Attorney, Agent, or Firm* — Klein, O'Neill & Singh, LLP

(57) ABSTRACT

A baseball or softball equipment organizing device having a body and a plurality of protrusions is disclosed in order prevent a dugout from becoming disorganized, and to prevent players from misplacing their equipment. The protrusions, which are used to hold the equipment of a player, may be symmetrically oriented along a vertical midline of the device so as to keep the device balanced, both when loaded with and devoid of equipment.

9 Claims, 19 Drawing Sheets

(56) References Cited

U.S. PATENT DOCUMENTS

| | | | |
|---|---|---|---|
| 8,616,385 B1* | 12/2013 | Doran | A63B 71/0036 |
| | | | 211/85.7 |
| 8,646,625 B2* | 2/2014 | Wang | A47G 25/0614 |
| | | | 211/106.01 |
| 9,919,196 B2* | 3/2018 | Gellman | A63B 71/0036 |
| 2012/0074083 A1* | 3/2012 | Geils | A63B 71/0045 |
| | | | 211/85.7 |

* cited by examiner

SPORTS EQUIPMENT ORGANIZING DEVICE

CROSS-REFERENCE TO RELATED APPLICATIONS

This application relates to and claims the benefit of U.S. Provisional Application No. 62/467,710 filed on Mar. 6, 2017, the contents of which is expressly incorporated by reference herein.

STATEMENT RE: FEDERALLY SPONSORED RESEARCH/DEVELOPMENT

Not Applicable

BACKGROUND

The various embodiments and aspects described herein relate to a baseball or softball device useful for organizing equipment used in baseball or softball.

In baseball or softball, each player may have one or more bats, a helmet, a glove, a drink and other equipment that are utilized for playing the game of baseball or softball. However, these pieces of equipment may be placed in a dugout without any specific organization and create a messy unsafe environment given that each player will place their equipment all over the dugout without any order. Accordingly, there is a need in the art for an improved device for keeping sports equipment organized, and preventing players from misplacing or damaging their equipment during games and practices.

BRIEF SUMMARY

The various embodiments and aspects disclosed herein address the needs discussed above, discussed below, and those that are known in the art.

The baseball or softball equipment-organizing device may be mounted onto a chain-link fence of a baseball or softball dugout commonly found throughout the United States and abroad. The device may have several protrusions that may allow a player to store his or her sports equipment in an organized safe fashion. The protrusions may be arranged along the device's vertical midline, which may be aligned to a center of gravity of the device, such that the device is vertically symmetrical. When the device is loaded with a player's equipment, the loaded device is balanced to securely hold the player's equipment. The vertical symmetry may prevent the device from becoming imbalanced, both when loaded with equipment and when not loaded with equipment. The organizing device also keeps the dugout safe, organized and free from clutter, and prevents players from losing or misplacing equipment, or confusing one player's equipment for another's.

The baseball or softball equipment organizing device may comprise a body defining a vertical midline aligned to a center of gravity of the device. The device may also comprise an at least one hook that may extend rearwardly from a back side of the body of the device and which may also be aligned with the vertical midline. One such hook may be horizontally oriented and a second hook may be vertically oriented in order to prevent the device from shifting. The hooks may be disposed anywhere along the back side of the device, such as but not limited to a top portion, a middle portion, or a bottom portion.

Extending from a front side of the body may be a first and second semicircle protrusion aligned with the vertical midline of the device which may be used for holding a bottle of water, sports drink, or other liquid container. The second semi-circle protrusion may also be used to hang protective eyewear, sunglasses and/or prescription glasses. The first semicircle protrusion may be enclosed on its sides and its bottom, allowing the bottle to be contained within the semicircle protrusion without falling. The second semicircle protrusion may only be enclosed on its sides, thus leaving the top and bottom of the semicircle protrusion open and available to receive the bottle while still providing support for the bottle. Additionally, the second semicircle protrusion may be disposed above and parallel to the first semicircle protrusion.

The device may also comprise a first and second pair of bat-holding protrusions which may be equidistant from the intersection of the vertical midline and the horizontal midline and which may extend frontwardly from the front side of the body, the first pair of bat-holding protrusions affixed along the horizontal midline adjacent to one side of the vertical midline, and the second pair of bat-holding protrusions affixed along the horizontal midline adjacent to the opposite side of the vertical midline. The first and second pair of bat-holding protrusions may each be at least as wide as a knob of a baseball bat or softball bat, and the first and second pair of bat-holding protrusions may each be at least as long as the diameter of a single knob of a baseball bat or softball bat.

A helmet holder peg which may be located at the bottom end portion of the equipment-organizing device and which may extend frontwardly from the front side of the device may be used to store a helmet. The helmet-holding peg may also be used to keep the device balanced as the helmet may act as a counterweight for the device.

The device may further comprise a first and second vertical rung extending frontwardly and vertically from the front side of the body. The first and second vertical rungs may be disposed on the horizontal midline of the device, equidistant from the vertical midline. The first vertical rung may be disposed to one side of the vertical midline and the second vertical rung may be disposed to the opposite side of the vertical midline. The vertical rungs can be used to hold equipment, such as but not limited to baseball/softball gloves and jackets. Furthermore, having the first and second vertical rungs opposite from each other and equidistant from the intersection of the vertical midline and the horizontal midline of the device may further aid in keeping the device balanced both when loaded and not loaded with equipment.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
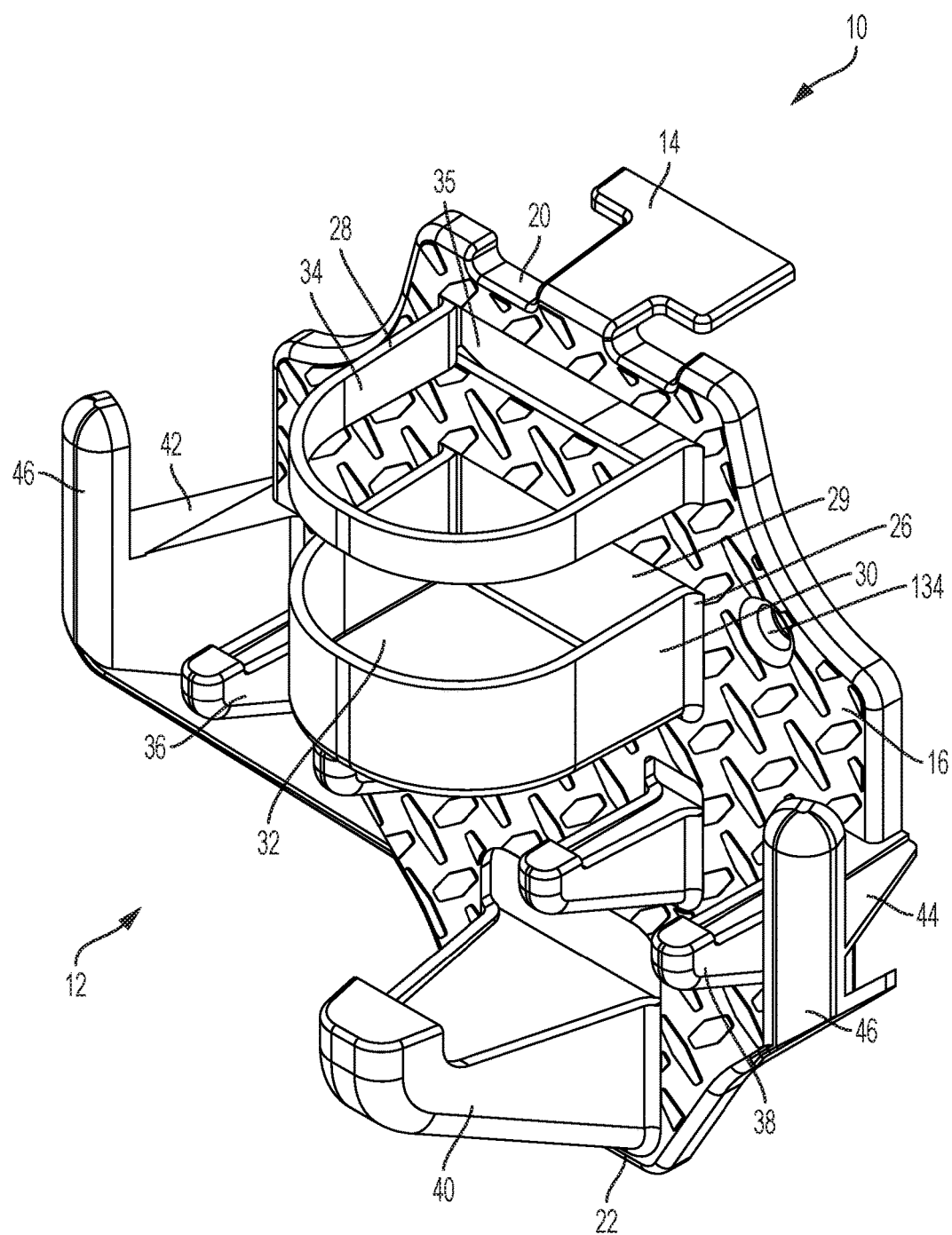
FIG. 1 is a perspective view of a front side of a first embodiment of a softball equipment organizing device.

Referring now to FIG. 1, a baseball and softball organizing device for organizing and holding softball and softball equipment is shown. The softball organizing device may be used to organize equipment used in softball. The softball organizing device may be composed of a body 10 with a plurality of protrusions 12 affixed to the body 10. The plurality of protrusions may be arranged along a vertical midline 19 of the body 10 or each protrusion offset from the vertical midline, another protrusion is placed equidistant from the vertical midline so that the protrusions are aligned to or vertically symmetrical about the vertical midline. When equipment is loaded on the protrusions, the loaded device is balanced about the center of gravity and the vertical midline 19.

Figure 2:
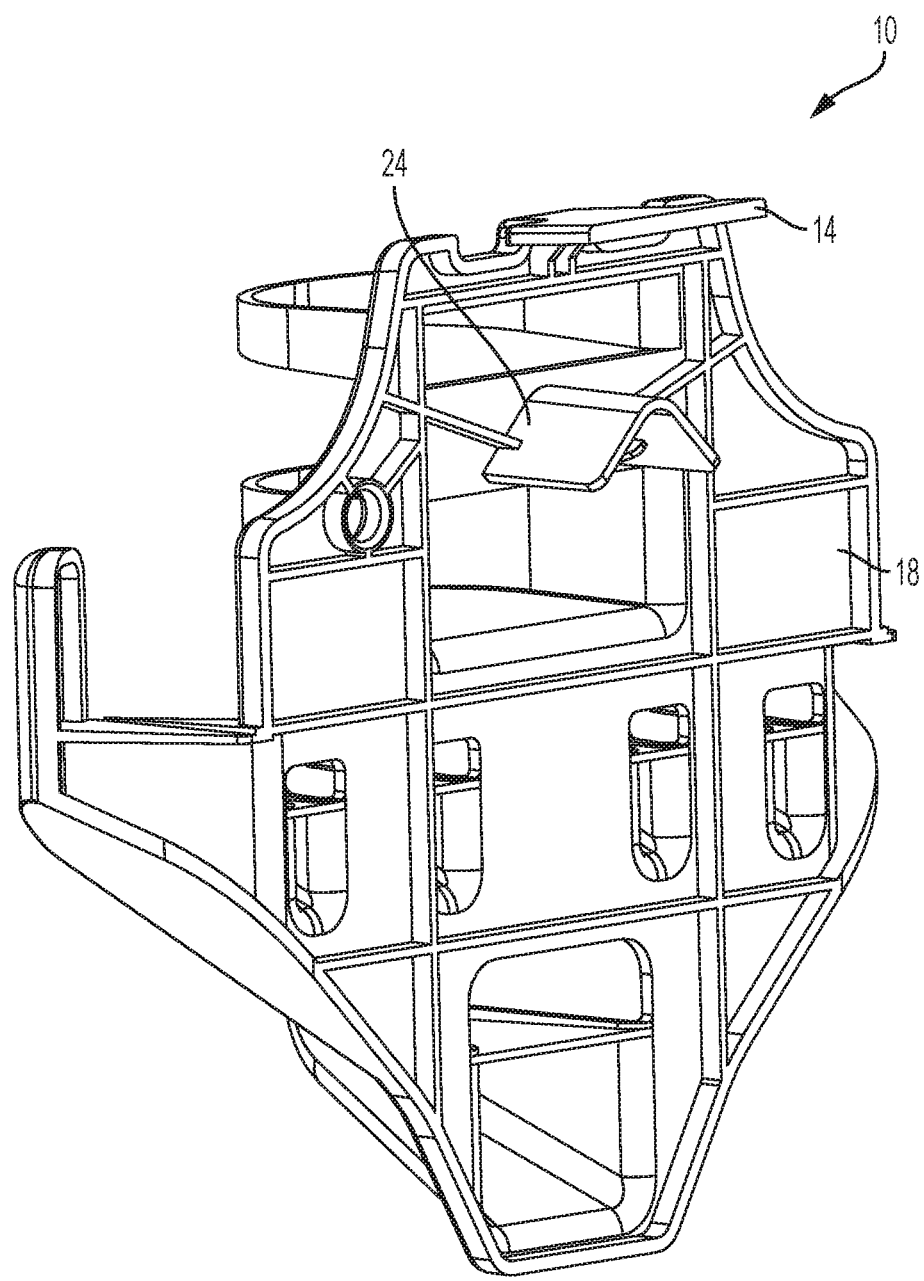
FIG. 2 is a perspective view of a back side of the device shown in FIG. 1.
Figure 3:
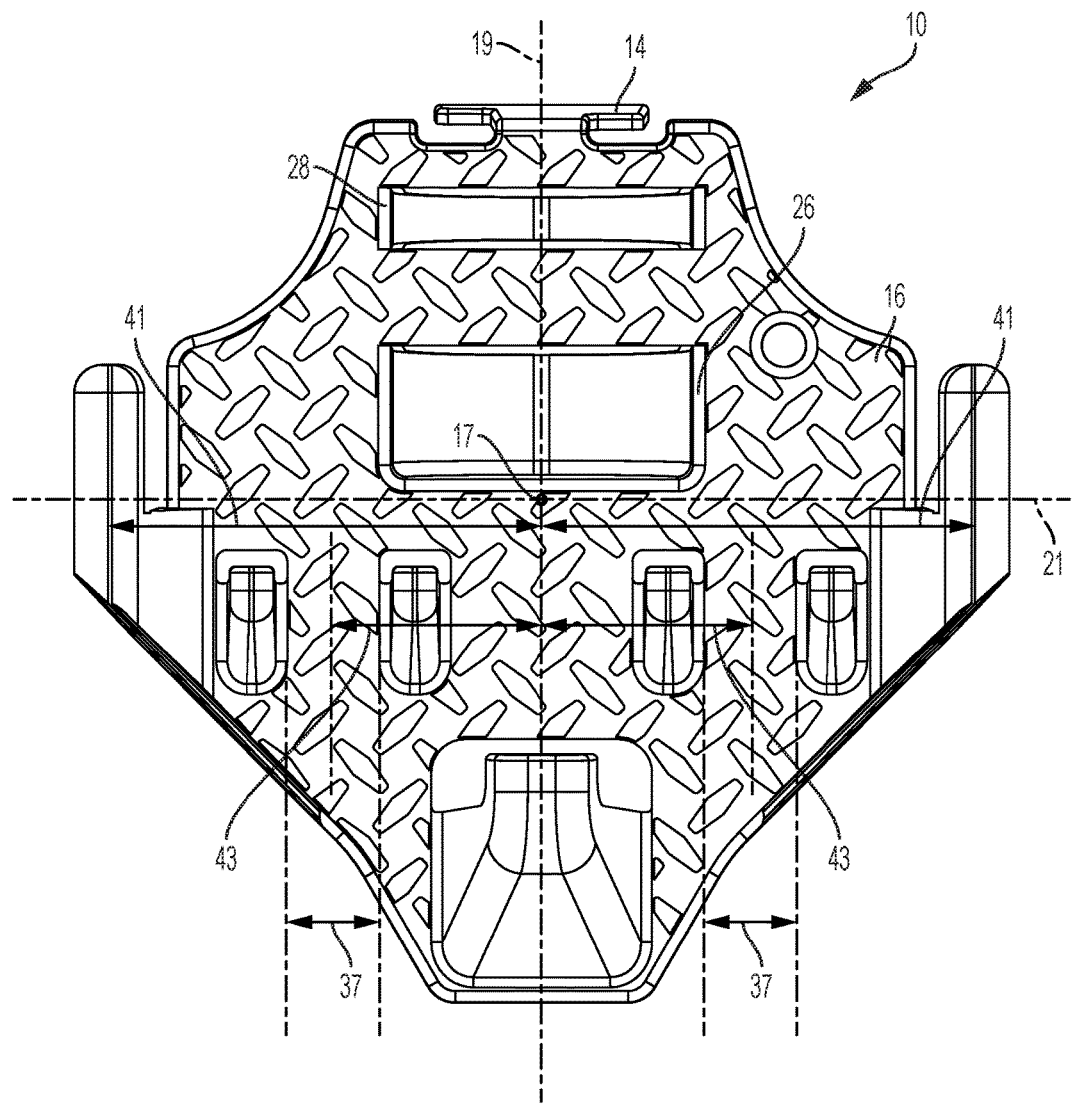
FIG. 3 is a front view of the device shown in FIG. 1.

The device may have a body 10 with a plurality of protrusions 12 affixed to said body 10 that may be arranged along a vertical midline 19, as shown in FIG. 3. The vertical midline 19 may be aligned to a center of gravity 17 of the device. The center of gravity 17 may be the point on the device where the vertical midline 19 intersects a horizontal midline 21. However, it is envisioned in other versions of the embodiment that the center of gravity 17 may change as the configuration of the plurality of protrusions 12 changes. Referring back to FIG. 1, in order to maintain a balanced device both while loaded with equipment and when devoid of equipment, the plurality of protrusions 12 may be affixed to the body 10 along the vertical midline 19 and/or equidistantly from the vertical midline 19 such that the device is vertically symmetrical about the vertical midline 19 and evenly balanced. Referring to FIG. 2, the body 10 of the device may have at least one horizontal hook 14 and at least one vertical hook 24. As seen in FIG. 1, the body 10 may define a top end portion 20, a bottom end portion 22, a front side 16, and a back side 18. The body 10 may be comprised of a resilient material strong enough to support the weight of baseball or softball equipment. For example, the material of the body 10 may be plastic and also an injection moldable material. It is also envisioned that the material of the body 10 may be aluminum, steel, polyvinyl chloride, or acrylonitrile butadiene styrene, though other resilient materials known to those skilled in the art are also contemplated.

The body 10 may be comprised of a resilient material strong enough to support the weight of baseball or softball equipment, and also the heavy use by baseball and softball players including when players hit the device when waiting in the dug out. The device may be fabricated from a plastic material or injection moldable material but it is envisioned that the material comprising the body 10 may be aluminum, steel, polyvinyl chloride, or acrylonitrile butadiene styrene, though other resilient materials known to those skilled in the art are also contemplated.

Figure 1A:
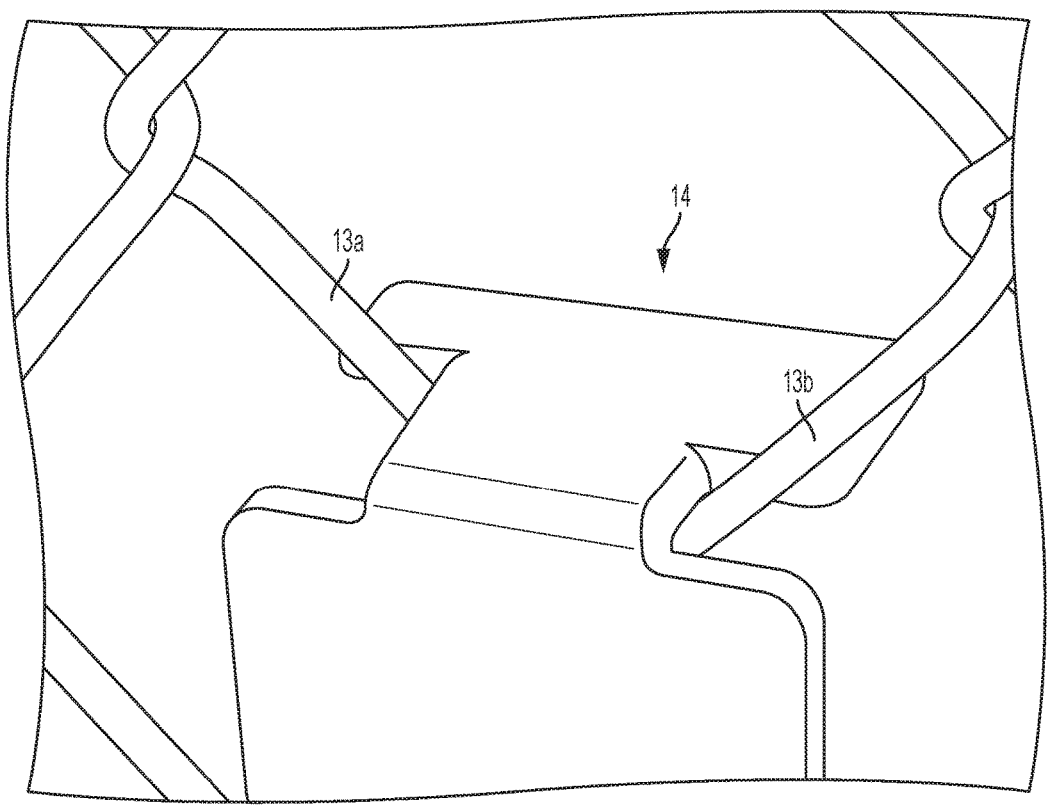
FIG. 1A is a front perspective view of a mount for mounting the device shown in FIG. 1 onto a chain link fence.
Figure 1B:
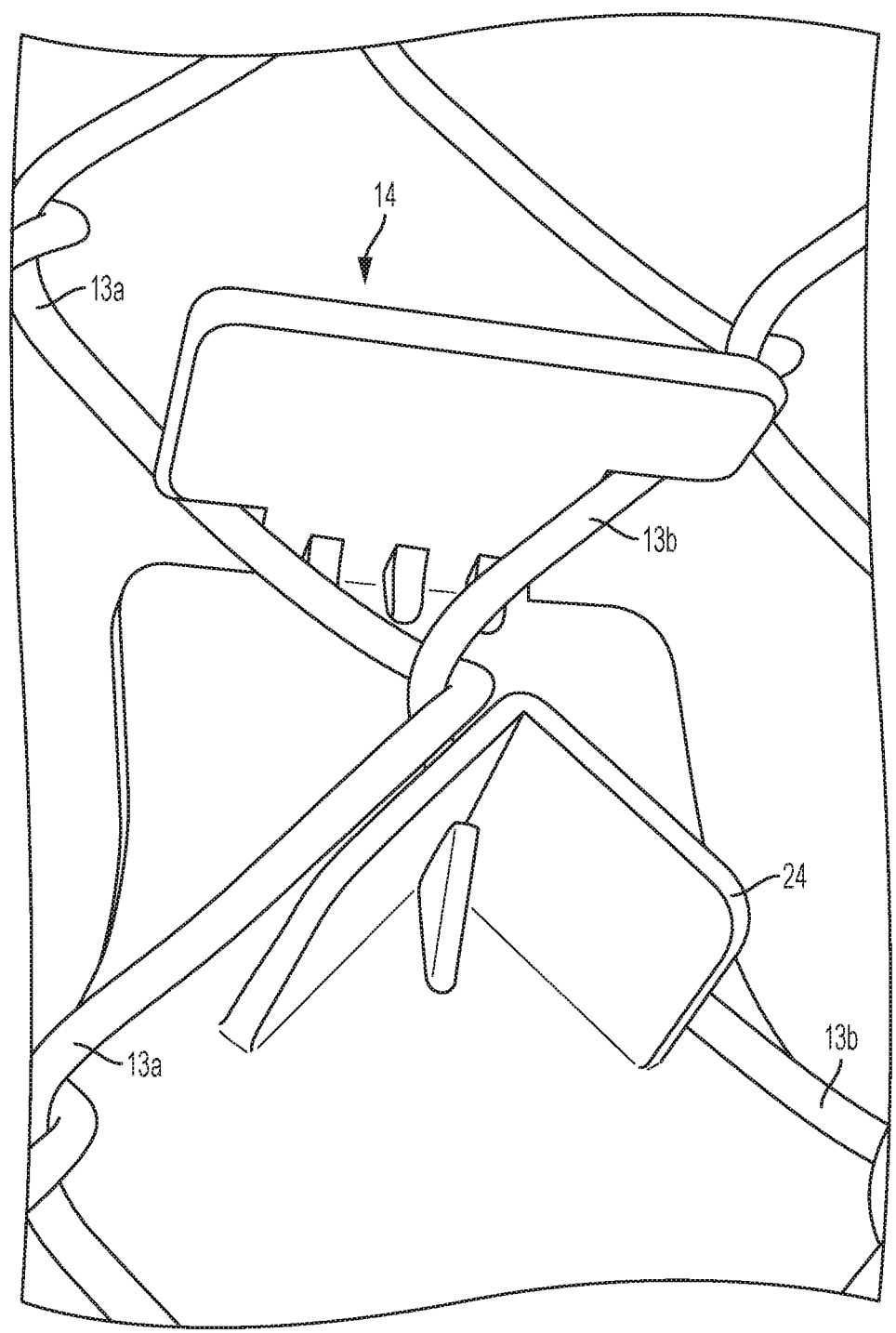
FIG. 1B is a rear perspective view of the mount for mounting the device shown in FIG. 1 onto the chain link fence.

The horizontal hook 14 may be aligned with the vertical midline 19 at the top end portion 20 of the body 10, extending rearwardly from the body 10. Some variations of the device may only have a horizontal hook 14, though other variations of the device may comprise a horizontal hook 14 and a vertical hook 24, as seen in FIGS. 1b, 2, 4, 5, and 6. The horizontal hook 14 may be T-shaped so that it can be inserted into a fence, and support and prevent the body 10 from falling off of the fence. As shown in FIG. 1A, the T shape of the horizontal hook 14 may be offset so that the T ends of the horizontal hook 14 snugly engage the links 13a, 13b of the fence. By way of example and not limitation, the horizontal hook 14 may be other shapes such as I-shaped, J-shaped, or a carabiner hook. The horizontal hook 14 may be used to prevent the body 10 from shifting. A vertical hook 24 aligned with the vertical midline 19 extending from the back side 18 of the body 10 may be added in order to provide more stability to the body 10. As shown in FIG. 1B, the vertical hook 24 may engage the links 13a, b of the fence and prevent the device from swinging or rotating when the device is bumped by a player or even if the device is unevenly loaded on the vertical midline 19. By way of example and not limitation, the vertical hook 24 may be shaped as an arch at a 45° angle to prevent the body 10 from shifting, though other angles and shapes for the vertical hook 24 are contemplated. It is envisioned that the vertical hook 24 may be disposed beneath the horizontal hook 14 aligned with the vertical midline 19 near the top end portion 20, though the vertical hook 24 may be positioned elsewhere along the vertical midline 19, such as but not limited to near the bottom end portion 22. The horizontal hook 14 and the vertical hook 24 may be composed of a material strong and resilient enough to support the weight of the device and a full set of baseball or softball equipment, such as but not limited to polyethylene, polypropylene, polyvinyl chloride, acrylonitrile butadiene styrene, aluminum, and steel.

As seen in FIG. 1, a first semicircle protrusion 26 and a second semicircle protrusion 28 may extend from the front side 16 of the body 10 and may be used to hold a bottle, though other equipment, such as but not limited to baseballs and softballs, may also be stored using the first semicircle protrusion 26 and the second semicircle protrusion 28. The first semicircle protrusion 26 and the second semicircle protrusion 28 may be aligned with the vertical midline 19 of the body 10, as seen in FIG. 3. Both the first semicircle protrusion 26 and the second semicircle protrusion 28 may be at least as wide as a standard water bottle, though narrower and wider widths, such as but not limited to the width of a soda bottle or a sports drink bottle, are also contemplated. For example, the first and second semicircle protrusions 26, 28 may fit a two to 3 inch outer diameter bottle. The first semicircle protrusion 26 may be comprised of an arch-shaped portion 30, a bottom side 32, and a flat portion 29. The arch-shaped portion 30 and the bottom side 32 may extend frontwardly from the body 10, and the flat portion 29 may be affixed to the front side 16 of the body 10. The second semicircle protrusion 28, which may be comprised of an arch-shaped side portion 34 and a flat portion 35, may be located above and parallel with the first semicircle protrusion 26. The arch-shaped portion 34 may extend frontwardly from the body 10, and the flat portion 35 may be affixed to the front side 16 of the body 10. For the first and second semicircle protrusions 26, 28, it is contemplated that both or either of the arch-shaped portions 30, 34 may be any geometric shape, such as but not limited to a triangle, a square, and a pentagon as long as the first and second semicircle protrusions 26, 28 may receive the water bottle. It is further contemplated that there may only be a first semicircle protrusion 26 or a second semicircle protrusion 28, or that more than two semicircle protrusions may be used vertically aligned with each other. The first semicircle protrusion 26 and the second semicircle protrusion 28 may be comprised of a resilient material that is capable of supporting the weight of a full bottle, such as but not limited to polyethylene, polypropylene, polyvinyl chloride, and aluminum.

Referring to FIG. 3, a first pair of two-pronged bat-holding protrusions 36 and a second pair of two-pronged bat-holding protrusions 38 may extend from the front side 16 of the body 10 and may be used to hold at least one baseball bat or a softball bat. The first pair of bat-holding protrusions 36 may be aligned with the horizontal midline 21 of the device and may be positioned to one side of the vertical midline 19, and the second pair of bat-holding protrusions 38 may be disposed along the horizontal midline 21 and may be positioned to the opposite side of the vertical midline 19, relative to the first pair of bat-holding protrusions 36. In other words, the distance of the first pair of bat holding protrusions to the vertical midline may be equal to the distance of the second pair of bat holding protrusions to the vertical midline. While it is envisioned in one variation that the first and second pairs of bat-holding protrusions 36, 38 may be placed along the same horizontal plane as each other, in other variations of the embodiment the first and second pairs of bat-holding protrusions 36, 38 may be staggered relative to each other such that one pair of bat-holding protrusions is on a higher or lower horizontal plane, i.e., not in line with the other pair of bat-holding protrusions. The first and second pairs of bat holding protrusions 36, 38 may be equidistantly 43 positioned on lateral sides of the vertical midline to help balance the device when the bats are loaded on the device, measured from a center of space 37 between each pair of bat-holding protrusions 36, 38, as seen in FIG. 3. The first pair of bat-holding protrusions 36 and the second pair of bat-holding protrusions 38 may each be spaced apart 37 from each other so as to be greater than a bat handle diameter but smaller than a bat knob diameter so that each of the bat-holding protrusions 36, 38 may hold a baseball bat or softball bat. For example, and not by limitation, the space 37 may be wide enough such that each bat-holding protrusion 36, 38 may fit a baseball or softball bat with a two-inch diameter knob, though other widths are contemplated. The first pair of bat-holding protrusions 36 and the second pair of bat-holding protrusions 38 may also be elongated frontwardly from the body 10 of the device such that lengths 39 of the first pair of bat-holding protrusions 36 and the second pair of bat-holding protrusions 38 may be sufficient to fit and hold more than one baseball bat (or softball bat) placed one baseball bat (or softball bat) in front of the other. By way of example and not limitation, the first pair of bat-holding protrusions 36 and the second pair of bat-holding protrusions 38 may each be four inches long, as long as the diameter of two baseball or softball bat knobs placed one in front of the other, thus allowing the device to store four baseball/softball bats instead of two. The first pair of bat-holding protrusions 36 and the second pair of bat-holding protrusions 38 may each be comprised of a resilient material that is capable of supporting the weight of at least one baseball bat or softball bat, such as but not limited to polyethylene, polypropylene, polyvinyl chloride, and aluminum.

Figure 5:
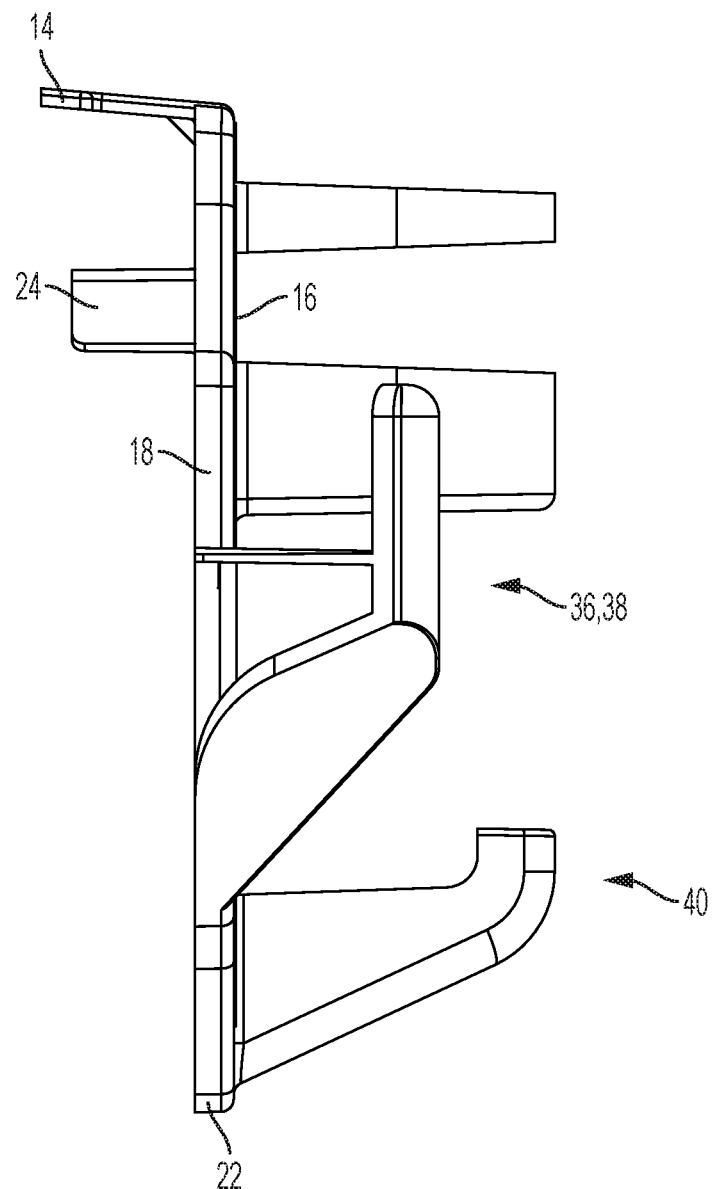
FIG. 5 is a side view of a left side of the device shown in FIG. 1.
Figure 6:
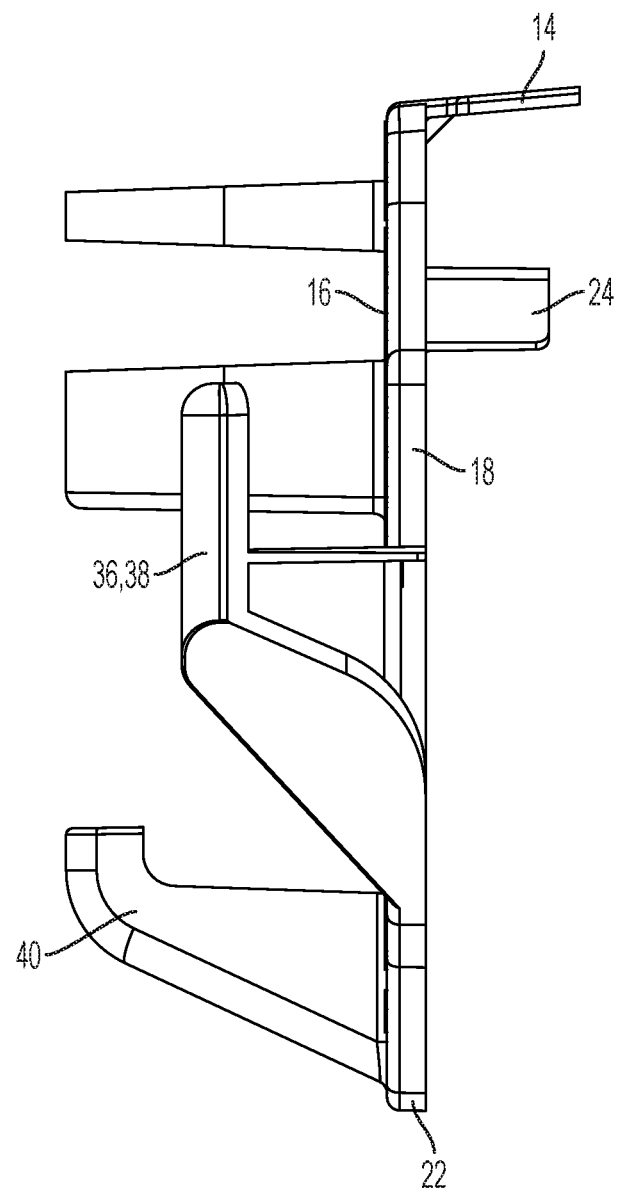
FIG. 6 is a side view of a right side of the device shown in FIG. 1.
Figure 7:
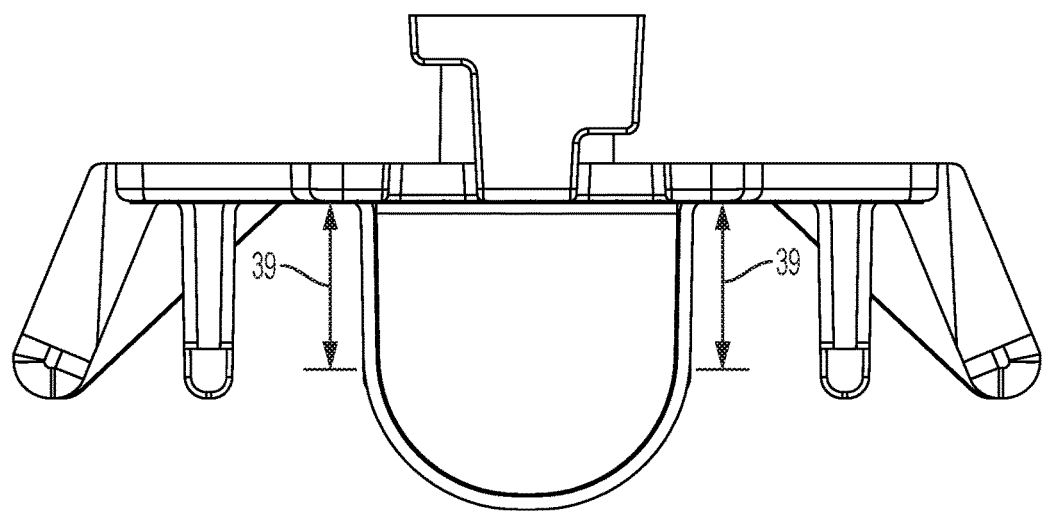
FIG. 7 is a top view of the device shown in FIG. 1.
Figure 8:
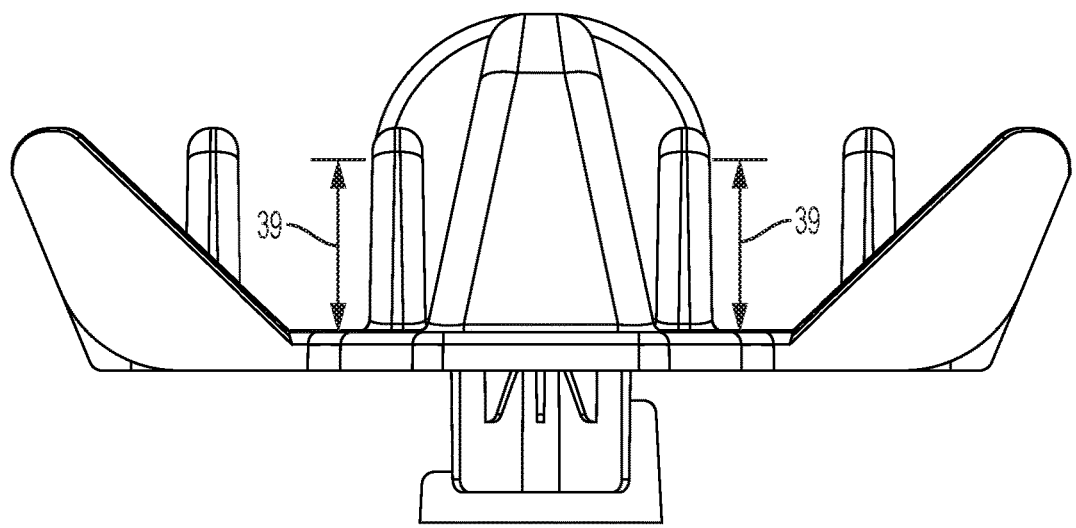
FIG. 8 is a bottom view of the device shown in FIG. 1.

Referring to FIG. 1, the device may have an at least one helmet holder peg 40 aligned with the vertical midline 19 extending frontwardly from the front side 16, and disposed near the bottom end portion 22 of the body 10. The at least one helmet holder peg 40 may be used to hold a helmet, such as a baseball helmet or a softball helmet, though other helmets and head coverings may be stored. Positioning the at least one helmet holder peg 40 near the bottom end portion 22 of the body 10 may allow a helmet to act as a counterweight for the body 10 of the device which in turn may further help to keep the device balanced. In particular, the helmet holder peg 40 may be positioned vertically lower than the first and second bat holding protrusions 36, 38, as shown in FIGS. 5 and 6. In this manner, the weight of the helmet provides further weight to the device to further stabilize it during use by providing torque resistance. In a different variation of the embodiment, more than one helmet holder peg 40 may be used so that more than one helmet may be stored on the device at a single time, in which case the multiple helmet holder pegs may be positioned on opposite sides of the vertical midline 19 so as to keep the device balanced. Alternatively, more than one peg 40 may be positioned vertically below the peg 40 along the vertical midline 19.

The device may further have a first vertical rung 42 and a second vertical rung 44 extending from the front side 16 of the body 10 of the device. The first vertical rung 42 and the second vertical rung 44 may be aligned with the horizontal midline 21. The first vertical rung 42 and the second vertical rung 44 may be equidistant 41 from the vertical midline 19. In one version of the embodiment it is envisioned that the first and second vertical rungs 42, 44 are aligned along the same horizontal plane as each other, though in other versions the vertical rungs 42, 44 may be staggered relative to each other such that one vertical rung is on a higher or lower horizontal plane, i.e., not in line with the other vertical rung. The first vertical rung 42 and the second vertical rung 44 may have vertical portions 46 that extend perpendicular to the horizontal midline 21, though other angles are contemplated for the vertical portions 46. The first vertical rung 42 and the second vertical rung 44 may be used to organize and store various pieces of equipment, such as but not limited to hats, gloves, jackets, long-sleeve shirts, jerseys, or towels. The first vertical rung 42 and the second vertical rung 44 may be comprised of any resilient material, such as but not limited to polyethylene, polypropylene, polyvinyl chloride, and aluminum.

Figure 3A:
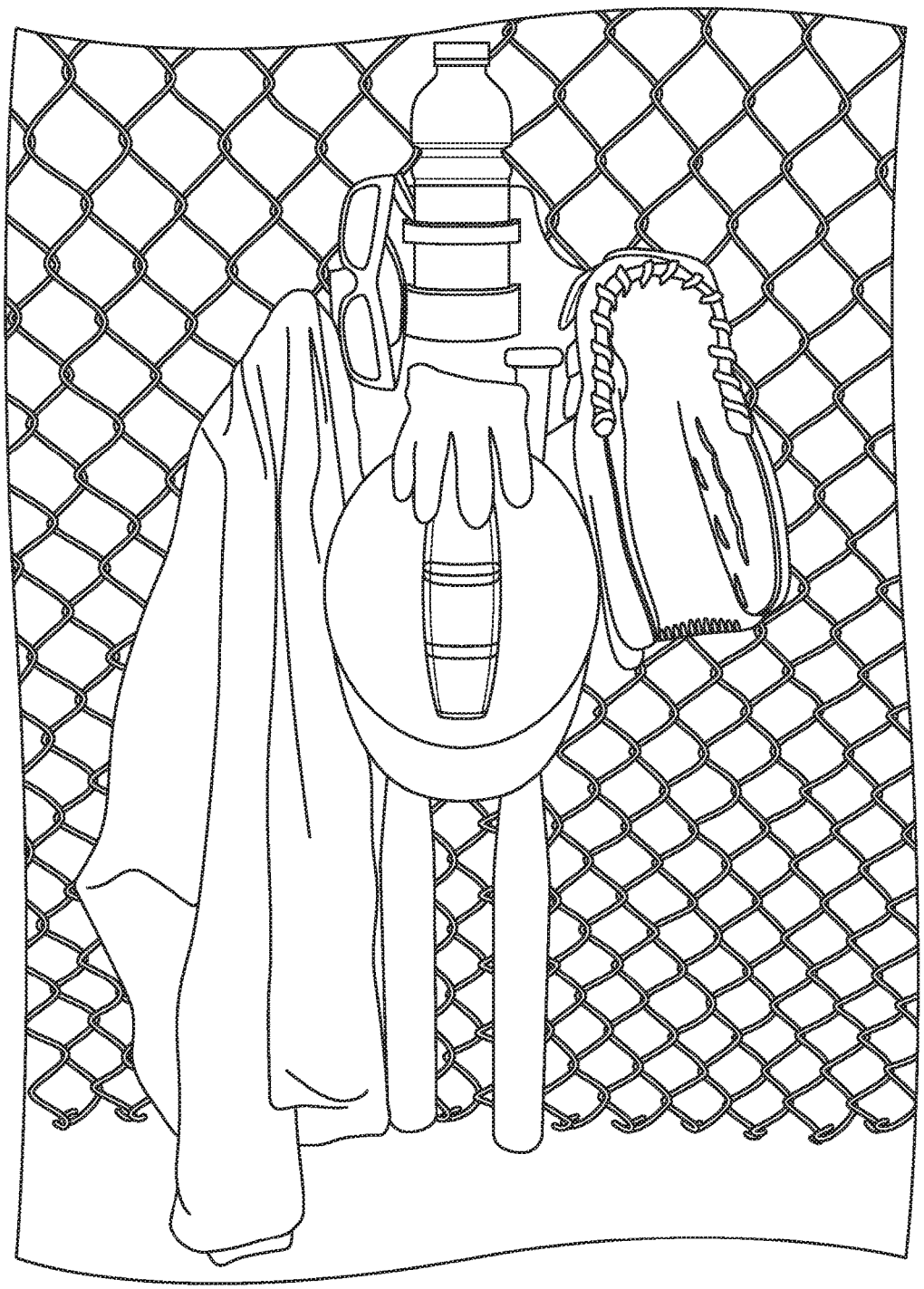
FIG. 3A illustrates the device shown in FIG. 1 when loaded with equipment.
Figure 4:
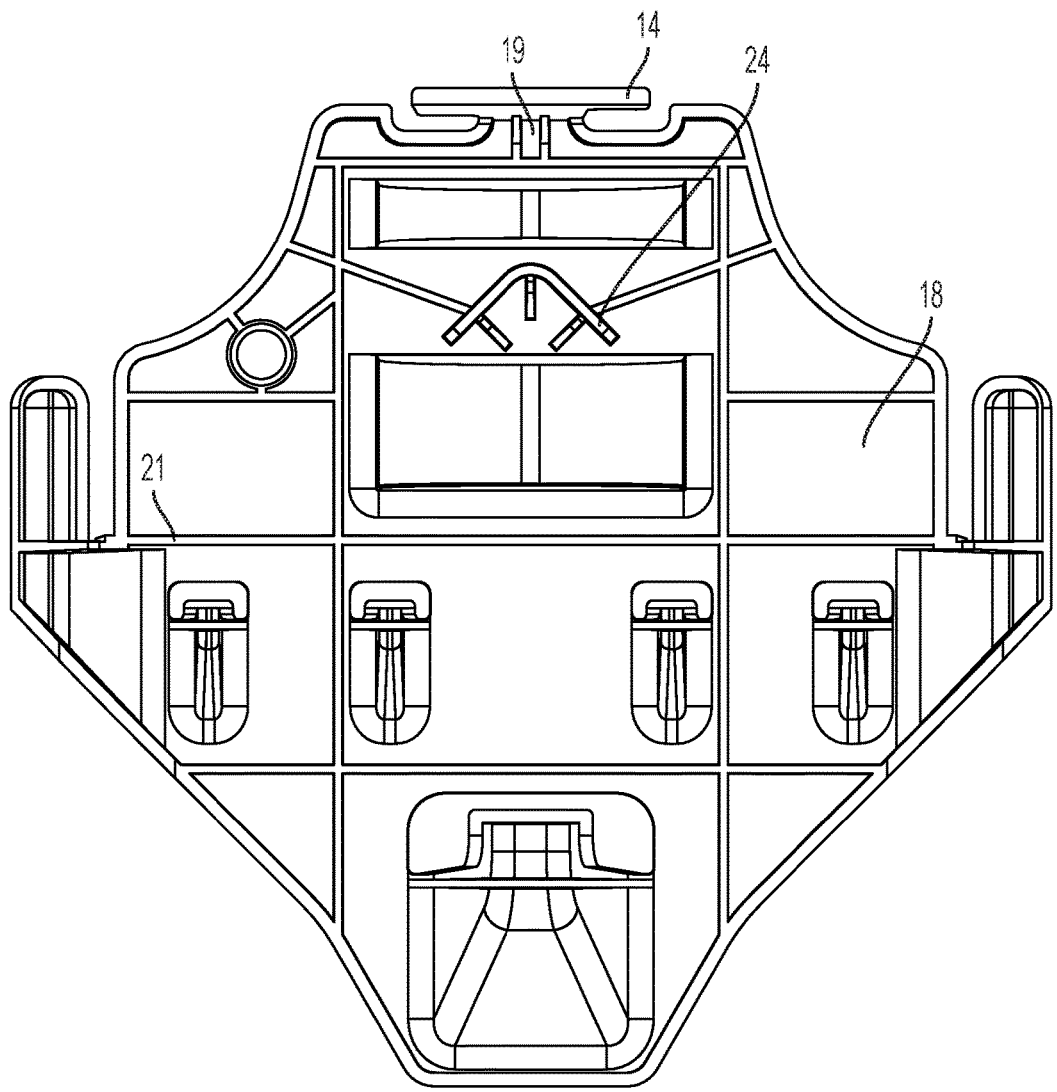
FIG. 4 is a rear view of the device shown in FIG. 1.

As shown in FIG. 3A, the device is loaded with softball equipment of a player but is balanced about the vertical midline 19 both with respect to the body of the device itself but also when fully loaded with two bats, glove (e.g., batting glove or catching glove), helmet, jacket and water bottle.

Figure 9:
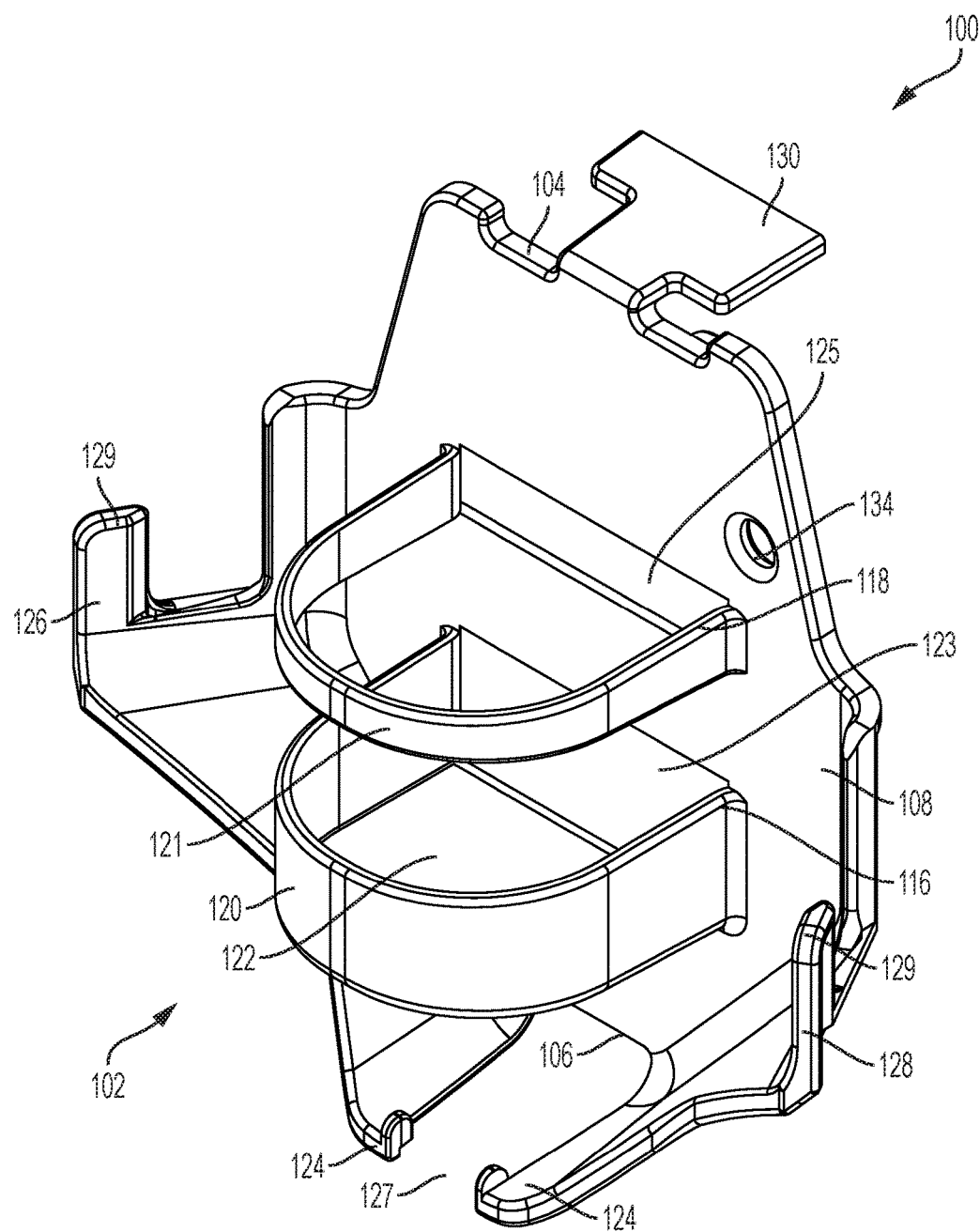
FIG. 9 is a perspective view of the front side of a second embodiment of the softball equipment organizing device.
Figure 10:
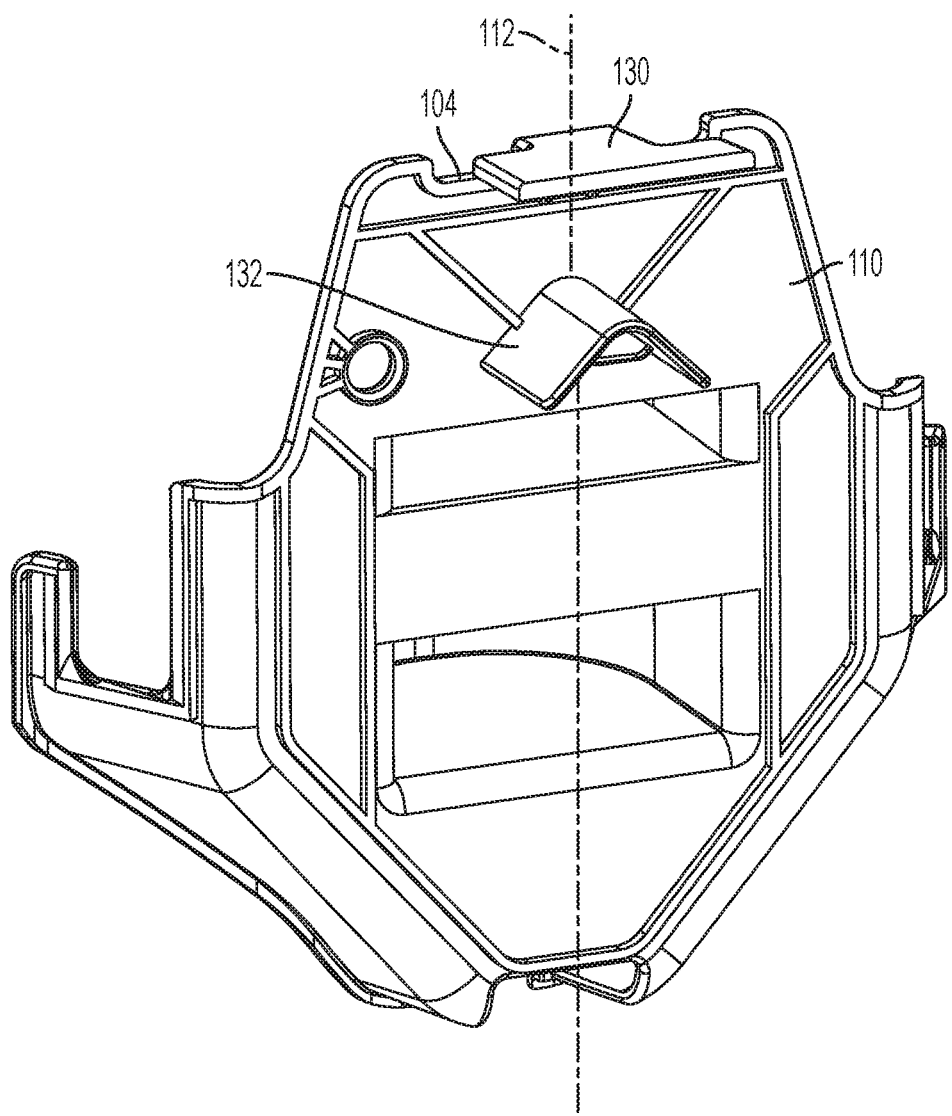
FIG. 10 is a perspective view of the back side of the device shown in FIG. 9.
Figure 11:
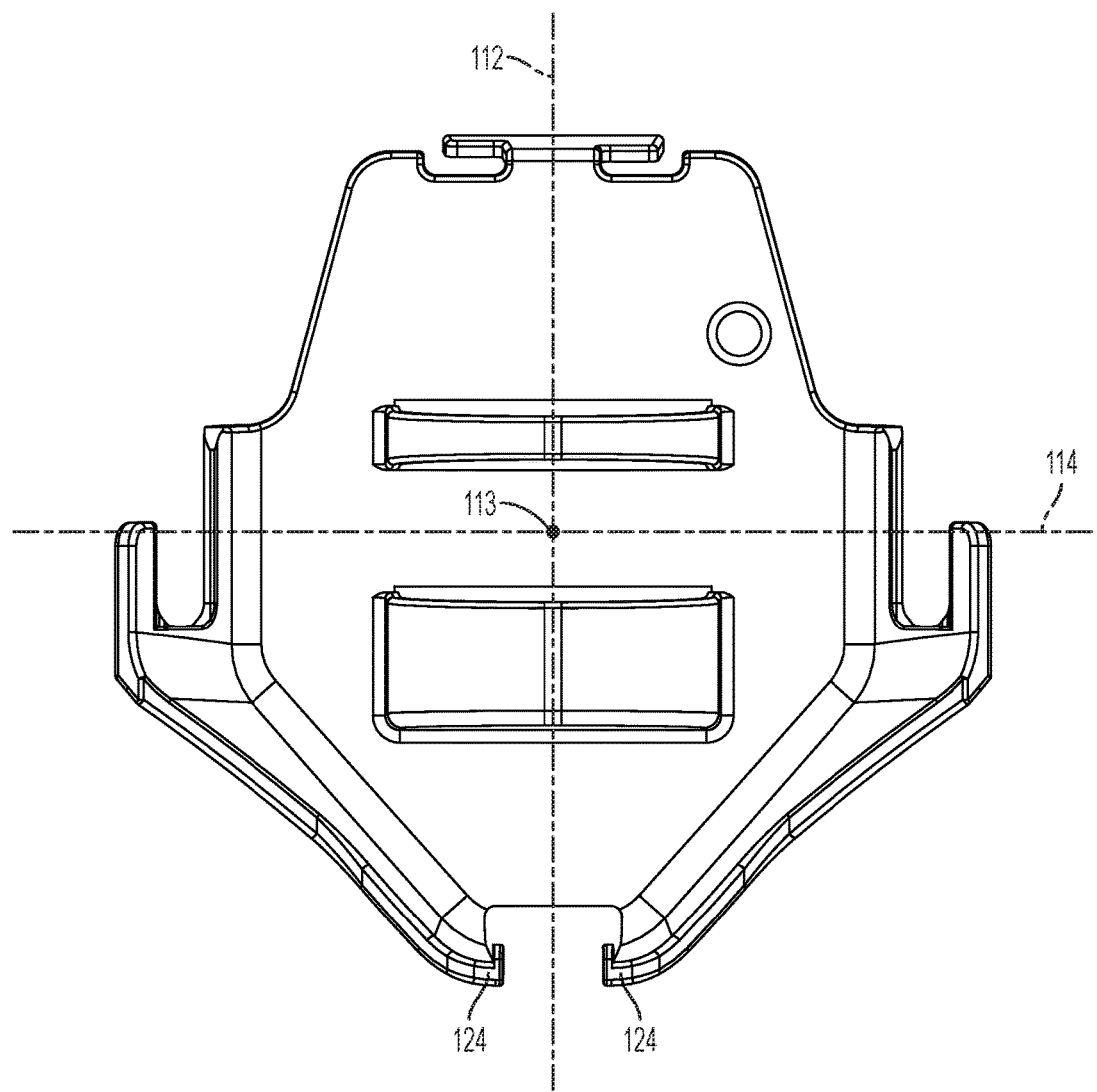
FIG. 11 is a front view of the device shown in FIG. 9.
Figure 12:
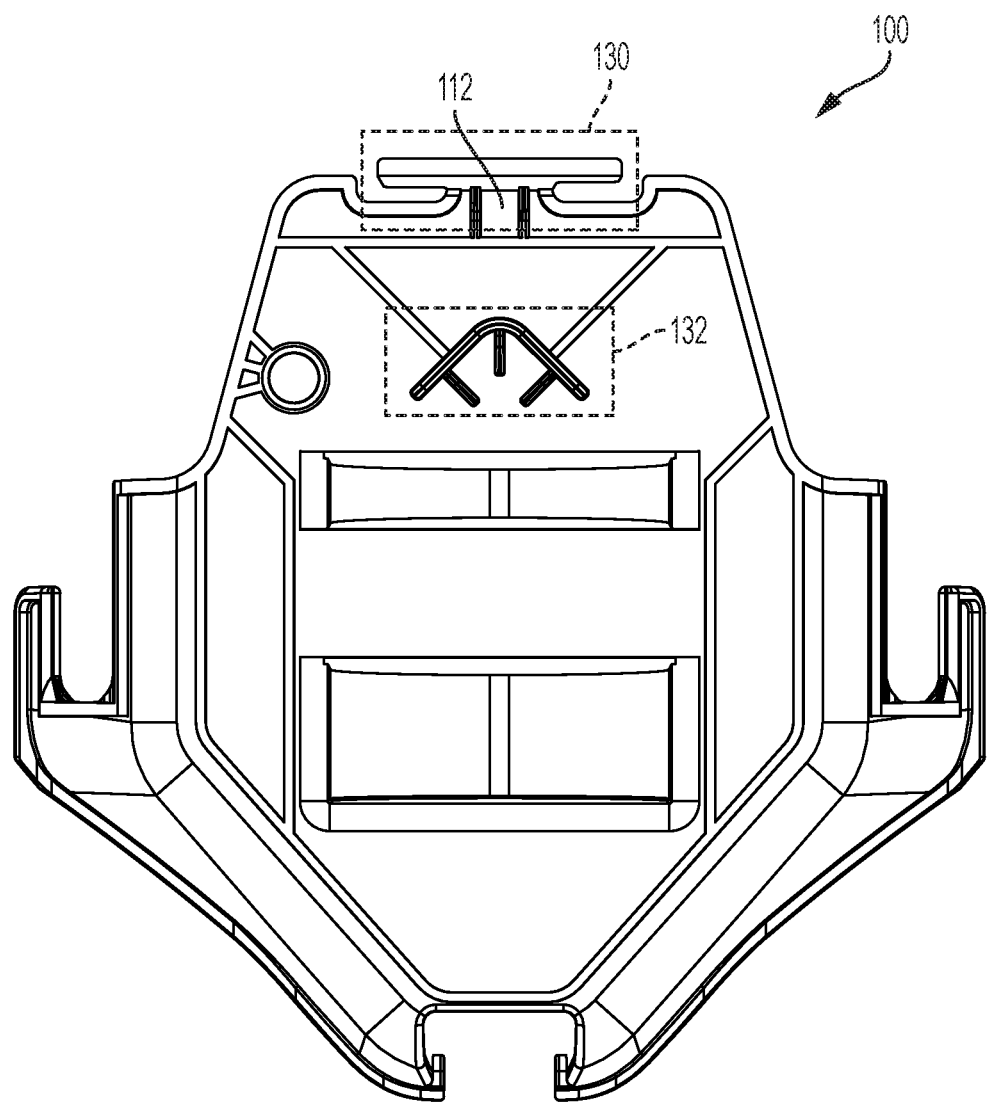
FIG. 12 is a rear view of the device shown in FIG. 9.
Figure 13:
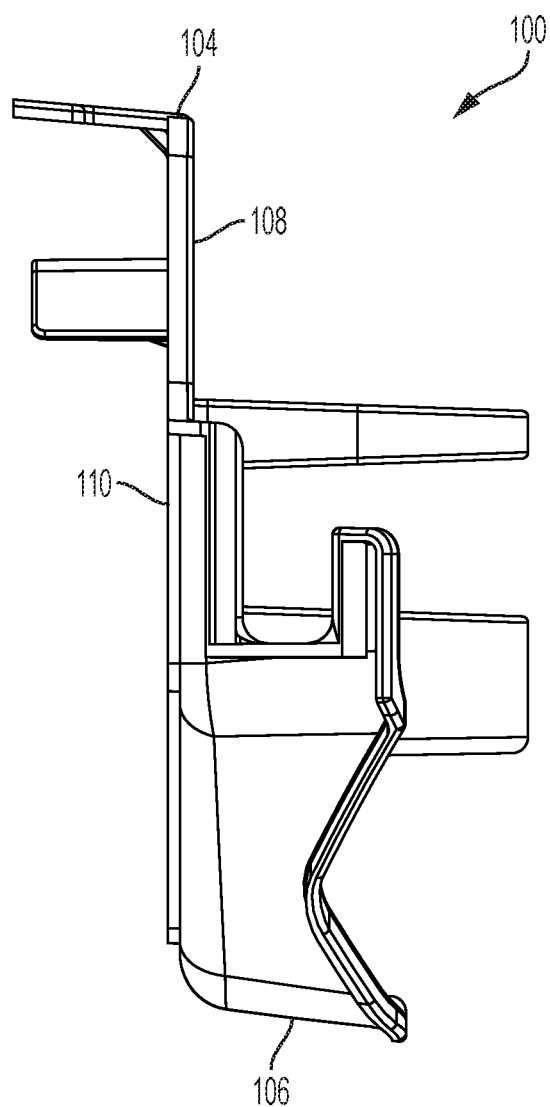
FIG. 13 is a side view of a left side of the device shown in FIG. 9.
Figure 14:
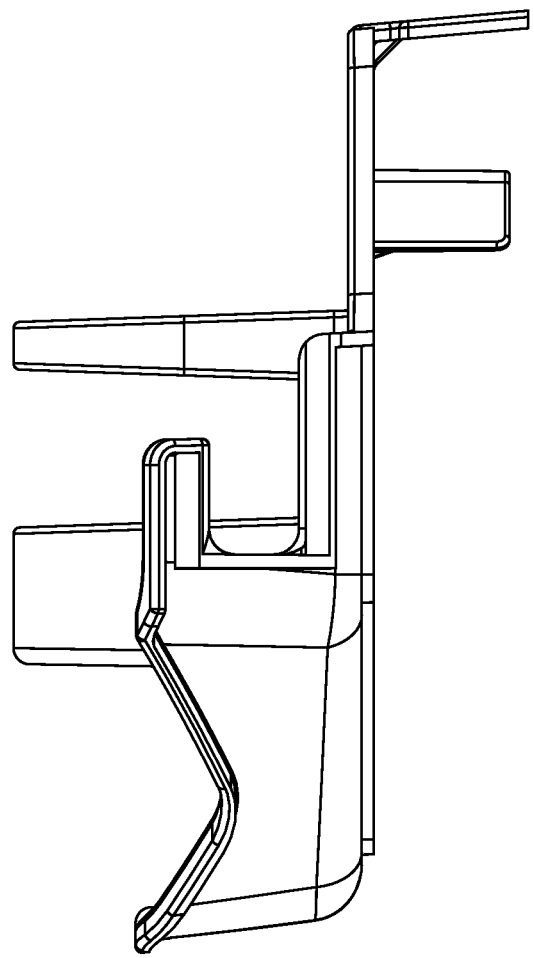
FIG. 14 is a side view of a right side of the device shown in FIG. 9.
Figure 15:
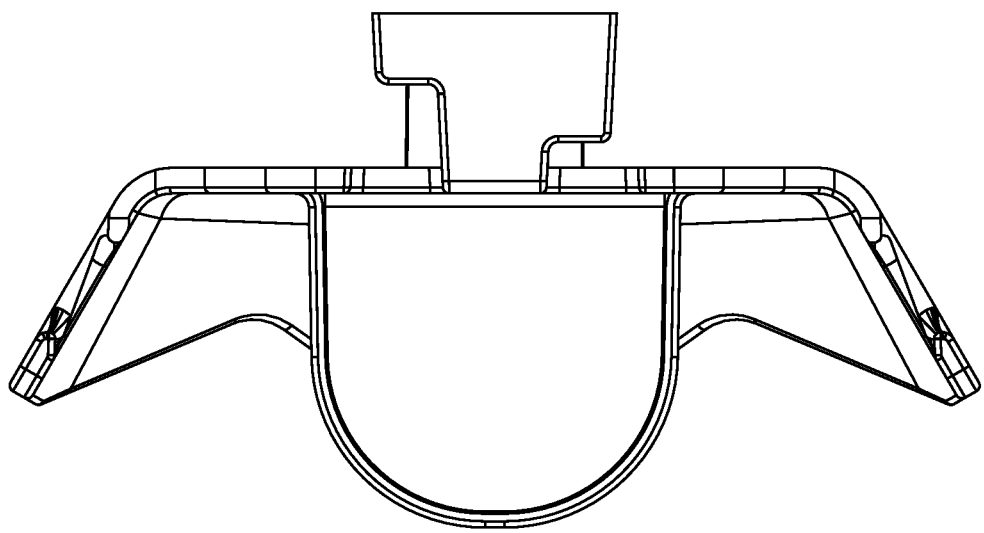
FIG. 15 is a top view of the device shown in FIG. 9.

Referring now to FIG. 9, a second embodiment of the softball equipment organizing device is shown. The device may have a body 100 with a plurality of protrusions 102 affixed to said body 100 that may be arranged along a vertical midline 112, as shown in FIG. 11. The vertical midline 112 may be aligned to a center of gravity 113 of the device. The center of gravity 113 may be a point where the vertical midline 112 intersects a horizontal midline 114 of the device. Referring back to FIG. 9, in order to maintain a balanced device both while loaded with equipment and when devoid of equipment, the plurality of protrusions 102 may be affixed to the body 100 along the vertical midline 112 and/or equidistantly from the vertical midline 112 such that the device is vertically symmetrical about the vertical midline 112 and evenly balanced. Referring to FIG. 10, the body 100 of the device may have at least one horizontal hook 130 and at least one vertical hook 132. As seen in FIG. 13, the body 100 may define a top end 104, a bottom end 106, a front side 108, and a back side 110. The body 100 may be comprised of a resilient material strong enough to support the weight of baseball or softball equipment, and also the heavy use by baseball and softball players including when players hit or throw the device. For example, the material of the body 100 may be plastic and also an injection moldable material. It is also envisioned that the material of the body 100 may be aluminum, steel, polyvinyl chloride, or acrylonitrile butadiene styrene, though other resilient materials known to those skilled in the art are also contemplated.

Referring back to FIG. 9, a first semicircle protrusion 116 and a second semicircle protrusion 118 may extend from the front side 108 of the body 100 and may be used to hold a bottle, though other equipment, such as but not limited to baseballs and softballs, may also be stored using the first semicircle protrusion 116 and the second semicircle protrusion 118. The second semicircle protrusion may 118 define an opening. The first semicircle protrusion 116 and the second semicircle protrusion 118 may be aligned with the vertical midline 112 of the body 100 so that when a bottle is received therein the weight of the bottle is vertically aligned to the center of gravity 113 of the device. Both the first semicircle protrusion 116 and the second semicircle protrusion 118 may be at least as wide as a standard water bottle (e.g., about 2 to 3 inches in diameter), though narrower and wider widths are also contemplated, such as but not limited to the width of a soda bottle or a sports drink bottle. The first semicircle protrusion 116 and the second semicircle protrusion 118 may both be comprised of an arch-shaped portion 120, 121 and a flat portion 123, 125, though the first semicircle protrusion may also have a bottom side 122. The arch-shaped portion 120, 121 and the bottom side 122 may extend frontwardly from the body 100, and the flat portion 123, 125 may be affixed to the front side 108 of the body 100. The second semicircle protrusion 118 may be located above and vertically aligned with the first semicircle protrusion 116. For the first semicircle protrusion 116 and the second semicircle protrusion 118, it is contemplated that both or either of the arch-shaped portions 120, 121 may be any geometric shape, such as but not limited to a triangle, a square, and a pentagon. It is further contemplated that there may only be a first semicircle protrusion 116 or a second semicircle protrusion 118, or that more than two semicircle protrusions may be used which are vertically aligned to each other. The first semicircle protrusion 116 and the second semicircle protrusion 118 may be comprised of a resilient material that is capable of supporting the weight of a full bottle, such as but not limited to polyethylene, polypropylene, polyvinyl chloride, and aluminum.

Figure 16:
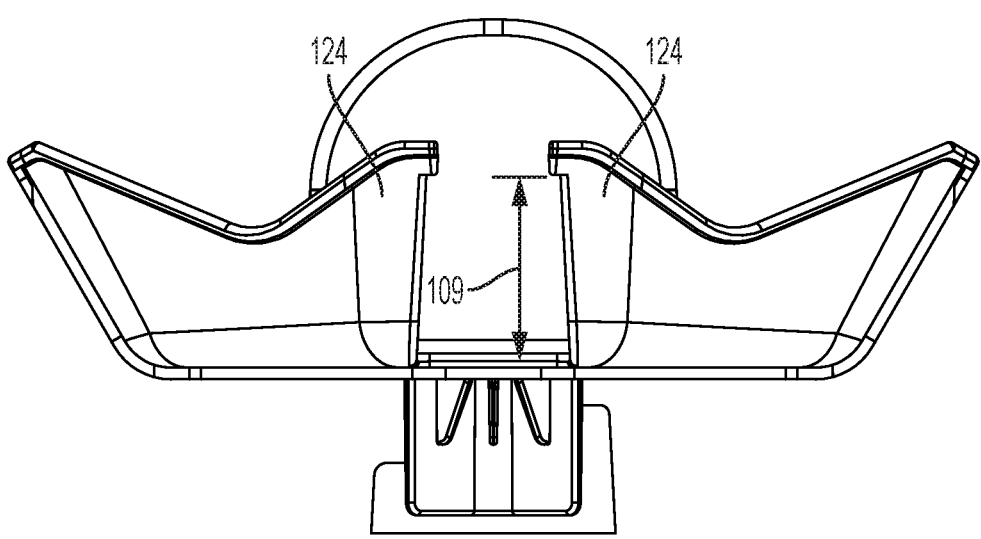
FIG. 16 is a bottom view of the device shown in FIG. 9.

The device may further have a two-pronged bat-holding protrusion 124 that may define a space 127, disposed near the bottom end 106 of the body 100 of the device and aligned with the vertical midline 112 such that the two prongs of the bat-holding protrusion 124 may flank opposite sides of the vertical midline 112. The width of the space 127 may be less than the width of the knob of a baseball bat or a softball bat, but wider than a handle or grip of the bat. For example, and not by limitation, the space 127 may be wide enough such that the bat-holding protrusion 124 may fit a baseball bat with a two-inch diameter knob (or softball bat), though other widths are contemplated. As seen in FIG. 16, the bat-holding protrusion 124 may extend a length 109 from the front side 108 of the body 100 of the device such that the bat-holding protrusion 124 may hold one or more bat. By way of example and not limitation, the bat-holding protrusion 124 may be four inches long, as long as the diameter of two baseball (or softball) bat knobs placed one in front of the other, which may allow the device to store two baseball (or softball) bats instead of one. The bat-holding protrusion 124 may be composed of a resilient material that is capable of supporting the weight of at least one baseball bat or softball bat, such as but not limited to polyethylene, polypropylene, polyvinyl chloride, and aluminum.

The device may also be comprised of a first vertical rung 126 and a second vertical rung 128 which may extend from the front side 108 of the body 100 and may be disposed on opposite sides of the vertical midline 112 and aligned with the horizontal midline 114. It is contemplated that the first vertical rung 126 and the second vertical rung 128 may be equidistant from the vertical midline 112. In one version of the embodiment it is envisioned that the first and second vertical rungs 126, 128 are aligned along the same horizontal plane as each other, though in other versions the vertical rungs 126, 128 may be staggered relative to each other such that one vertical rung is on a higher or lower horizontal plane, i.e., not in line with the other vertical rung. The first vertical rung 126 and the second vertical rung 128 may have a vertical portion 129 that extends perpendicular to the horizontal midline 114, though other angles are contemplated for the vertical portion 129. The first vertical rung 126 and the second vertical rung 128 may be used to organize and store various pieces of equipment, such as but not limited to helmets, hats, gloves, jackets, long-sleeve shirts, jerseys, or towels. The first vertical rung 126 and the second vertical rung 128 may be comprised of any resilient material, such as but not limited to polyethylene, polypropylene, polyvinyl chloride, and aluminum.

Referring to FIG. 10, the device may be comprised of a horizontal hook 130 and a vertical hook 132 that may extend from the back side 110 of the body 100 and may align with the vertical midline 112. Some variations of the device may only have a horizontal hook 130. The horizontal hook 130, which may be disposed near the top end 104 of the body 100, may be T-shaped so that it can be inserted into a fence to support and balance the body 100 of the device. The horizontal hook 130 may comprise other shapes and configurations that may prevent the device from shifting. By way of example and not limitation, the horizontal hook 130 may be I-shaped, J-shaped, or a carabiner hook. The vertical hook 132 disposed near the top portion 104 of the body 100 may be utilized in order to provide more stability to the body 100 of the device. By way of example and not limitation, the vertical hook 132 may be shaped as an arch at a 45° angle to prevent the body 100 from shifting, though other angles and shapes for the vertical hook 132 are contemplated. It is envisioned that the vertical hook 132 may be disposed beneath the horizontal hook 130 aligned with the vertical midline 112 near the top end 104, though the vertical hook 132 may be positioned elsewhere along the vertical midline 112, such as but not limited to near the bottom end 106. The horizontal hook 130 and the vertical hook 132 may be composed of a material strong and resilient enough to support the weight of the device and a full set of baseball or softball equipment, such as but not limited to polyethylene, polypropylene, polyvinyl chloride, acrylonitrile butadiene styrene, aluminum, and steel. The horizontal and vertical hooks 130, 132 may be identical in structure and function to the horizontal and vertical hooks 14, 24 discussed above in the first embodiment.

In both of the devices 10, 100, a hole 134 may be provided. A carabiner or other attachment device may be used to secure the device 10, 100 to a bag (e.g., baseball or softball bag). The carabiner may be fed through the hole 124 and also through a loop or handle of the bag. Other attachment devices may include a rope, strap that is fed through the hole 134 and also through the loop or handle of the bag. The device 10, 100 may be removed or attached to the bag by way of tying or untying the rope or utilizing a strap with a removably attachable clip.

The various aspects described herein in relation to the device is applicable to both a baseball or softball. Accordingly, when the discussion is directed to baseball, the same aspects may also be applied to softball. Conversely, when the discussion is directed to softball, the same aspects may also be applied to baseball.

The above description is given by way of example, and not limitation. Given the above disclosure, one skilled in the art could devise variations that are within the scope and spirit of the invention disclosed herein, including usage of other types of resilient materials to use for the body. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A personal baseball or softball equipment organizing device for hanging on a fence so that the equipment of a player can be hung on the device and balanced to prevent the device and equipment from inadvertently falling off the fence, comprising:
    a body defining a vertical midline aligned to a center of gravity of the device;
    an at least one hook for affixing said device to a fence disposed near a top portion of the body, extending from a back side of the body, and aligned with the vertical midline;
    a first semicircle protrusion, disposed on the vertical midline, defining a bottom side and an open top portion, and extending from a front side of the body;
    a second semicircle protrusion, disposed on the vertical midline, defining an opening disposed above and parallel with the first semicircle protrusion, and extending from the front side of the body;
    a first and second pair of two-pronged bat-holding protrusions extending from the front side of the body, the first pair of bat-holding protrusions affixed along a horizontal midline adjacent to a side of the vertical midline, and the second pair of bat-holding protrusions affixed along the horizontal midline adjacent to an opposite side of the vertical midline;
    an at least one helmet holder peg extending from the front side of the body disposed near a bottom end portion of the body aligned with the vertical midline; and
    a first and second vertical rung extending from the front side of the body, the first vertical rung disposed to a side of the vertical midline of the device, and the second vertical rung disposed to an opposite side of the vertical midline.

2. The device of claim 1, further comprising a horizontal hook such that the device is prevented from shifting.

3. The device of claim 1, further comprising a vertical hook such that the device is prevented from shifting, the vertical hook disposed on and extending from the back side of the device.

4. The device of claim 1, wherein the first and second semicircle protrusions are at least between 2 to 3 inches.

5. The device of claim 1, wherein the width of the first and second pairs of bat-holding protrusions are each greater than a baseball bat handle diameter but smaller than a baseball bat knob diameter.

6. The device of claim 1, wherein the first and second pairs of bat-holding protrusions are equidistant from the vertical midline.

7. The device of claim 1, wherein the first and second vertical rungs extend perpendicular to the horizontal midline.

8. The device of claim 1, wherein the first and second vertical rungs are equidistant from the vertical midline.

9. The device of claim 1, wherein the first and second vertical rungs are comprised of a material resilient enough to support at least the weight of baseball equipment.

\* \* \* \* \*